June 3, 1930.　　　　S. SCHIFF　　　　1,761,237
CAKE MIXER
Filed Nov. 21, 1928　　　4 Sheets-Sheet 1

Inventor
Sigmund Schiff

By Murray and Rugelter
Attorneys

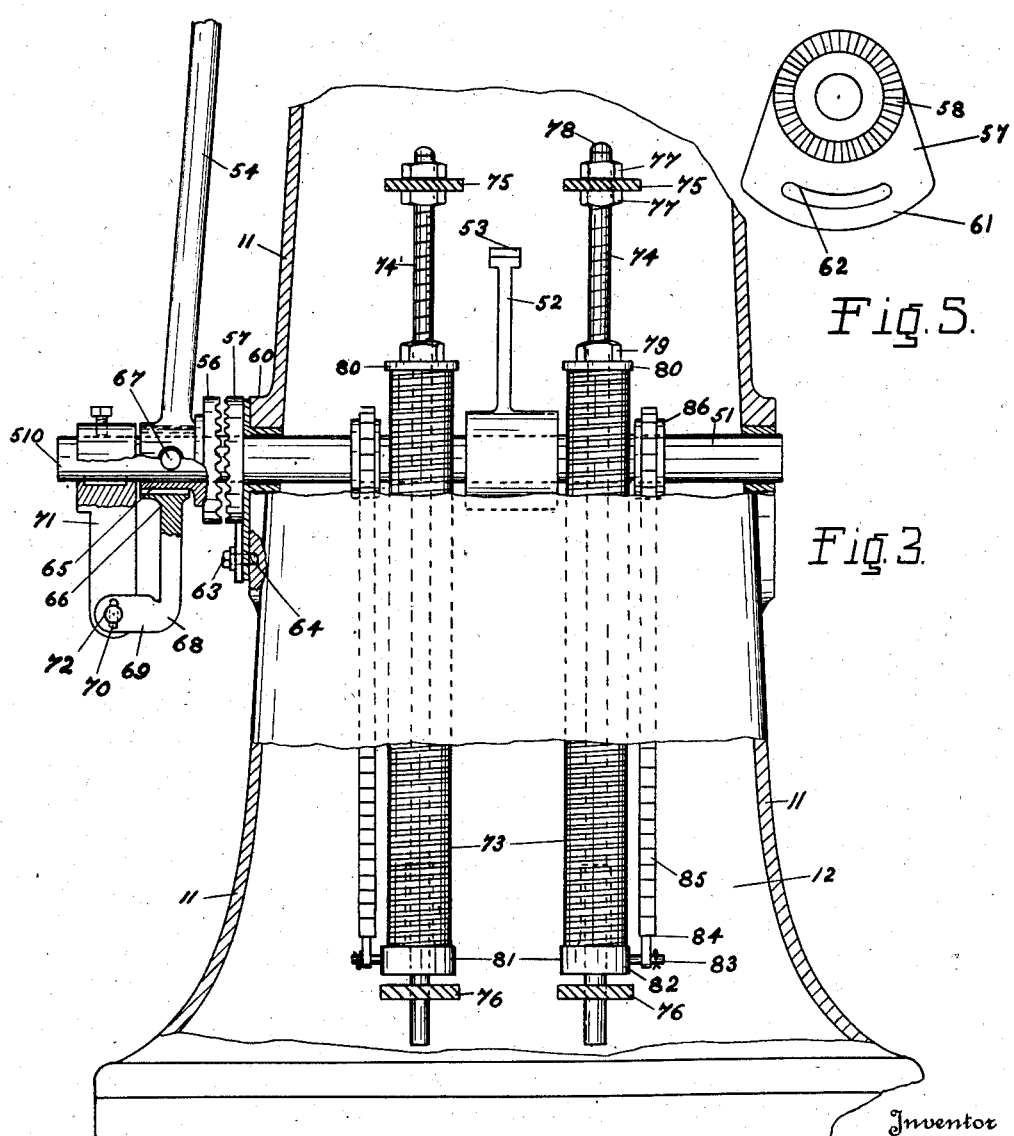

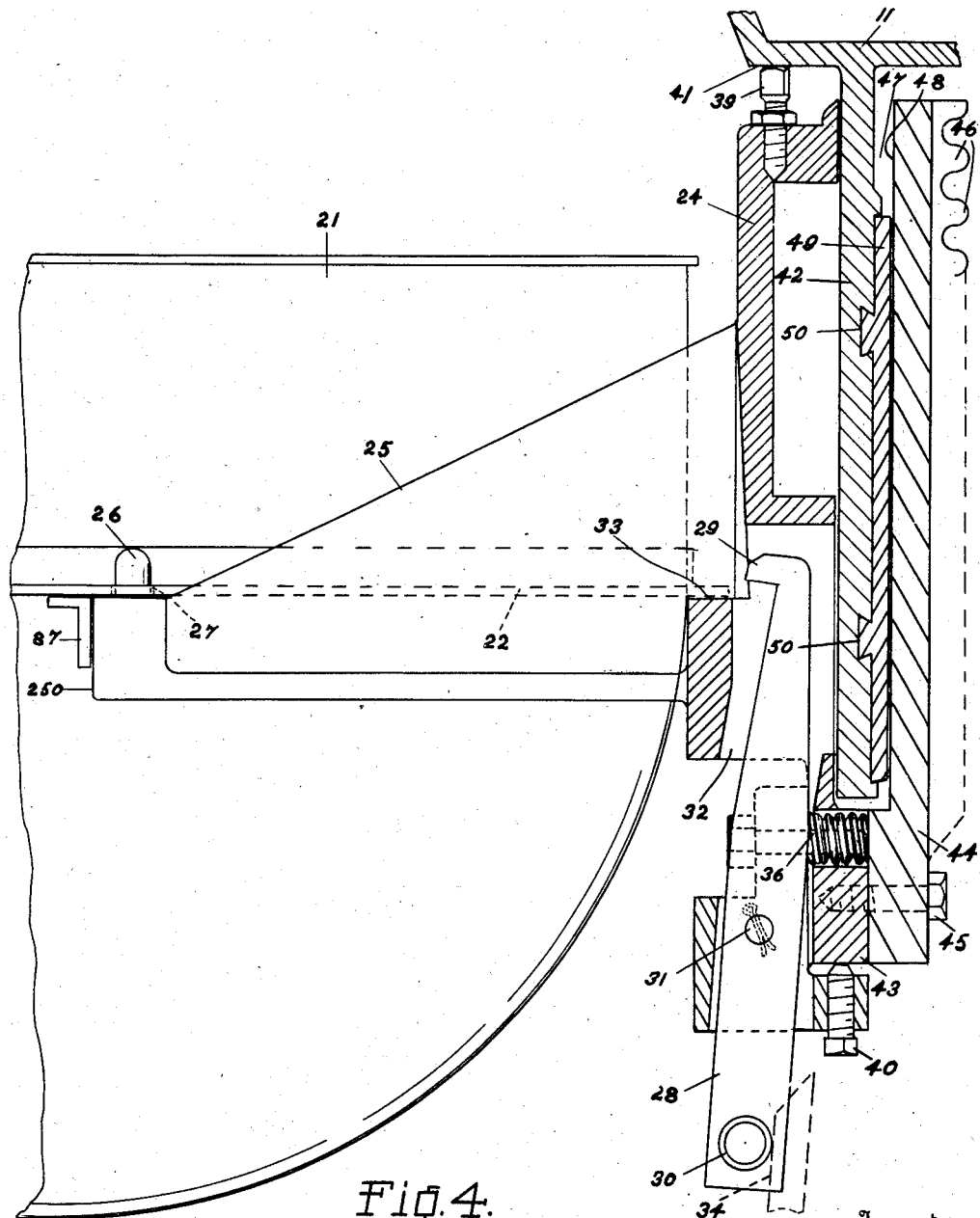

Patented June 3, 1930

1,761,237

UNITED STATES PATENT OFFICE

SIGMUND SCHIFF, OF CINCINNATI, OHIO, ASSIGNOR TO THE J. H. DAY COMPANY, OF CINCINNATI, OHIO, A CORPORATION OF OHIO

CAKE MIXER

Application filed November 21, 1928. Serial No. 320,914.

This invention relates to a receptacle receiving and elevating device such as may be used with dough mixers.

An object of this invention is to provide a device in which a container for ingredients may be held and released with a minimum of effort.

Another object is to provide a device to quickly receive the container and raise the same into position for the mixing operation.

Another object is to provide a locking device to retain the container at any desired elevation.

Another object is to provide an efficient means whereby these objects may be attained by simple operations, requiring a minimum of effort.

The means for attaining the objects of this invention are more fully set forth in the following description and shown in the accompanying drawings in which:

Fig. 3 is an enlarged cross-sectional view taken on line 3—3 of Fig. 2, parts being broken away to show the arrangement and structure of the counterbalancing and locking devices forming part of the invention.

Fig. 4 is an enlarged cross-sectional view taken on line 4—4 of Fig. 1.

Fig. 5 is a plan view of a clutch member forming a detail of the invention.

Figure 1:
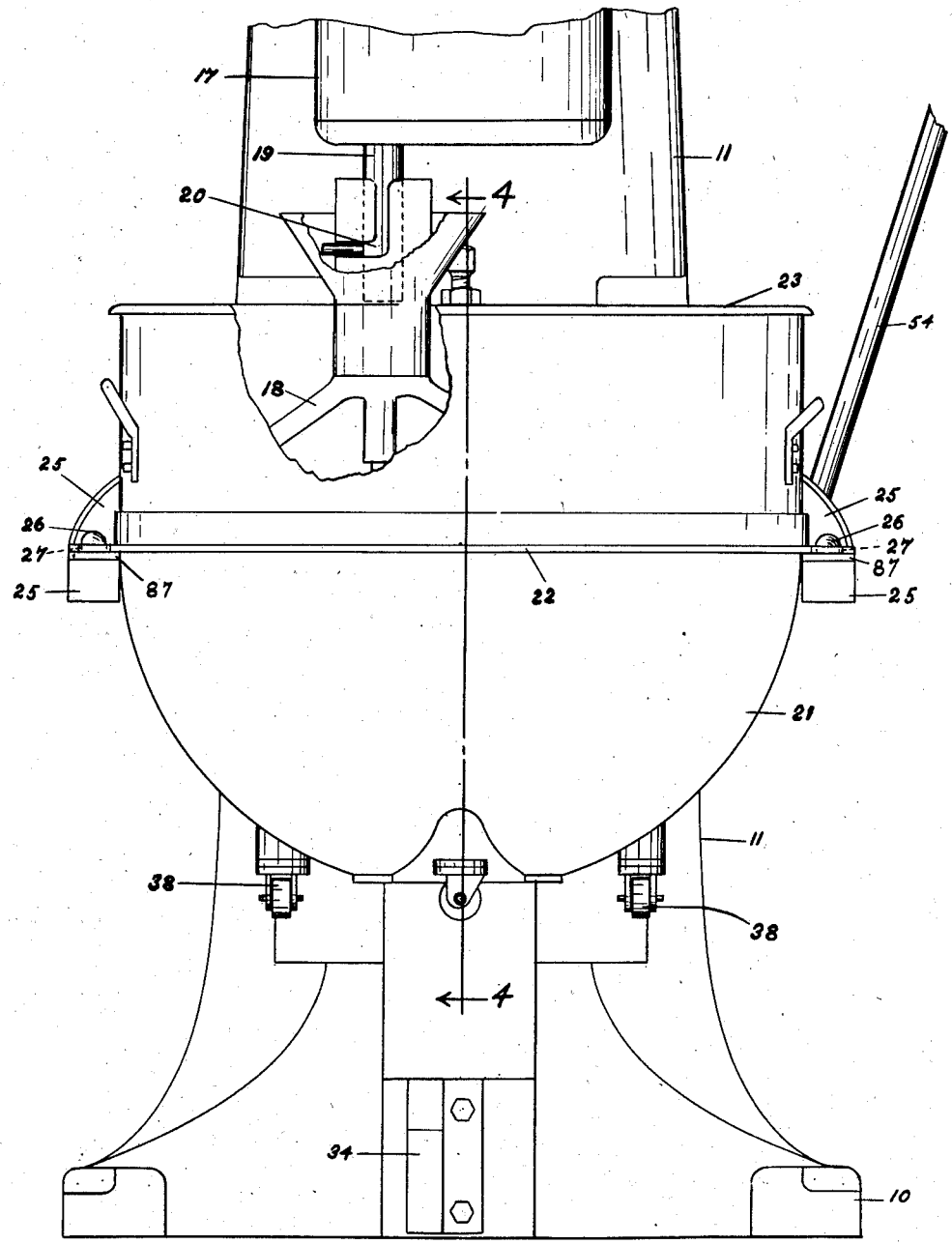
Fig. 1 is a front elevational view of the device, parts being broken away, showing the container in the raised position.

The device comprises a base 10 which carries a hollow frame 11 comprising various compartments adapted to accommodate the elevating and power mechanisms of the device of this invention. Compartment 12 houses the counterbalancing mechanism forming part of the present invention, and compartments 13 and 14 house a driving motor 15 and clutch 16 respectively. The motor and clutch may be of any approved type suitable for use in a device such as is disclosed herein.

Suitably secured to the housing 11 is an overhanging driving head 17 containing mechanism for actuating an agitator 18 or the like driven by motor 15 and controlled by clutch 16. The agitator is removably connected to agitator shaft 19 by any suitable means such as a bayonet slot construction indicated at 20. Said agitator is adapted to extend into a container or mixing bowl 21 supported below the driving head by means to be hereinafter described. Said bowl is provided with an encircling flange or abutting means 22 carried by the bowl body and lying in a plane substantially parallel to the plane of the upper edge 23 of the bowl or container.

A container support frame 24 comprising embracing arms 25 is reciprocally mounted upon housing 11 and adapted for vertical movement, between upper and lower limits, relative to the housing and the agitator. Arms 25 are provided at the free ends thereof with upwardly extending guide lugs 26 which are receivable in perforations 27 formed in the encircling flange 22 as shown in Fig. 1. When the mixing bowl is in the position indicated, the flange 22 rests upon the extending arms for supporting the bowl.

Forward tipping or tilting of the mixing bowl is precluded by providing an automatic latch device mounted preferably on the frame 24. Reference is made to Fig. 4 wherein the latch device is illustrated in detail. The latch member proper comprises an arm 28 provided at one end thereof with a hook or latch head 29, and at the other end with a follower in the form of a roller 30 rotatably mounted transversely of the latch member. The latch member is pivotally mounted upon the frame 24 at a point 31 intermediate the ends of the latch member. The head or hook end 29 of the latch member extends through and is movable within a way or opening 32 formed in the frame 24. Movement of the hook portion 29 toward the bowl serves to retain the flange 22 in abutment upon an abutting face 33 formed on the frame. In Fig. 4, the latch is shown in the inoperative position.

Movement of the latch member about the pivotal mounting 31 is effected by a trip lug or track 34 bolted or otherwise secured to the base of the machine. It should be clear from the disclosure in Fig. 2, that when the container support frame 24 is lowered, the follower or roller 30 will contact the inclined portion 35 of the trip lug 34. Further lowering of the frame will cause the roller to ride along the incline and upon the track portion for moving the latch member about the pivot 31. The above described movement serves to move the latch to the inoperative position indicated at Fig. 4. Upon raising the frame 24 to the operative position indicated in Fig. 2, the latch member is moved to the operative or latching position by means of a compression spring 36 or an equivalent means. The trip lug 34 is so disposed, relative to the follower 30, that the latch member is actuated when the bowl is about to rest upon the floor or supporting surface 37. The bowl or container is provided with casters or rollers 38 to facilitate movement thereof along the floor 37 when the bowl is filled or partially filled with material.

The travel of container support frame 24 relative to the housing is limited by means of adjusting screws 39 and 40 carried by the frame 24. Screw 39 may be adjusted to limit upward movement of the frame, and screw 40 to limit downward movement thereof. Screw 39 limits upward movement by abutting a projection 41 formed on the frame, and screw 40 abuts a similar abutment disposed adjacent the base of the machine. If desired, the adjusting screws may be supported in the metal of the housing 11 and base 10.

Container support frame 24 is guided vertically along the housing by means of a way 42. A lug 43 formed on the lower end of the frame 24 supports a rack 44 which is secured thereto by bolts 45. The rack extends upwardly coextensively with the frame 24, and is provided with the usual teeth 46 (Fig. 4). It should be noted that for the greater part of its length, the rack is spaced from the frame 24 as at 47. The back 48 of the rack is adapted to contact and slide upon a longitudinal block of Babbit metal 49 suitably mounted upon the inside surface of the housing 11 as shown in Fig. 4. Said block may be secured in position by dovetailing or anchoring as shown at 50.

Figure 2:
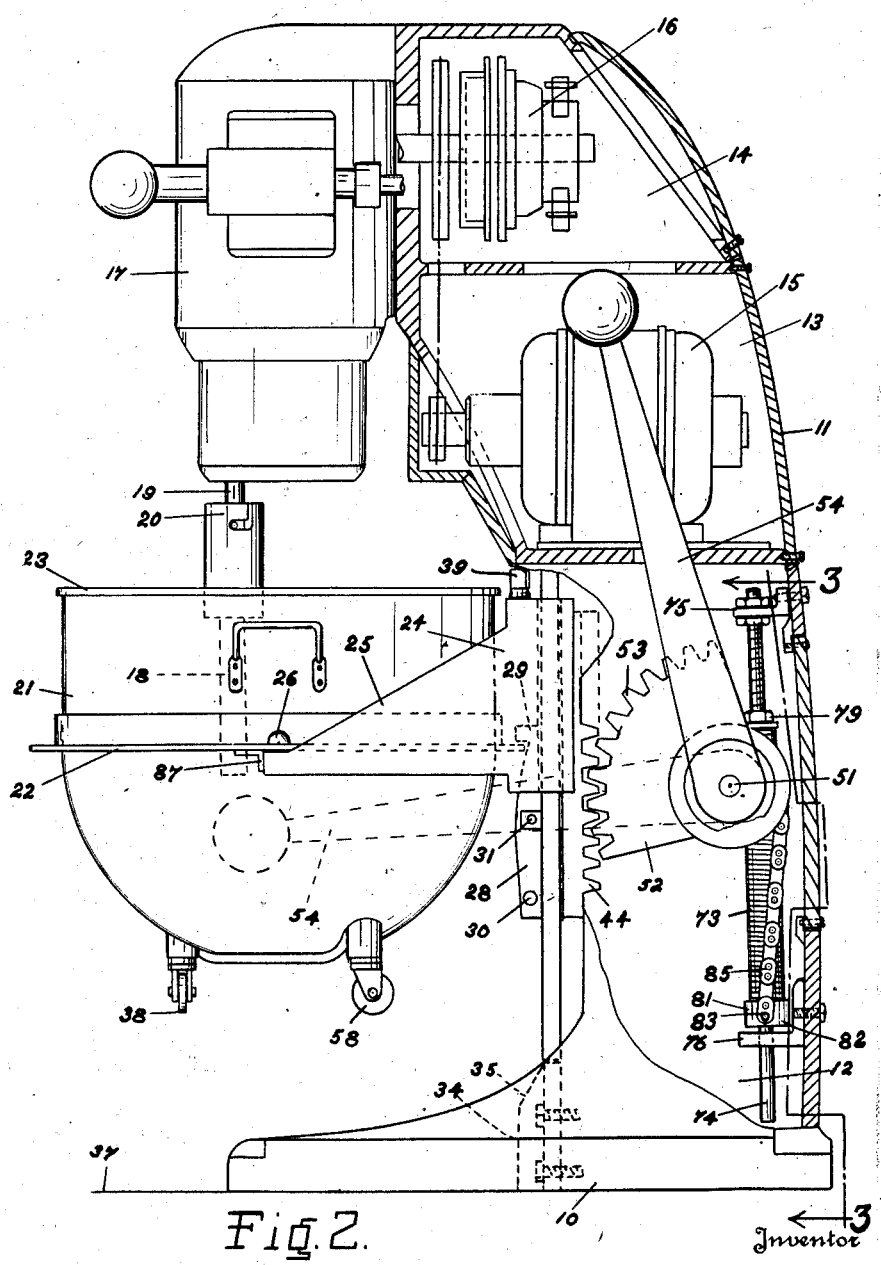
Fig. 2 is a side elevational view of the device, parts being broken away.

The means for raising and lowering the container support frame comprises a lever actuated shaft 51 rotatably mounted in suitable bearings transversely of the housing 11. Said shaft has fixedly mounted thereon a gear segment 52 the teeth 53 of which are adapted for engagement with the teeth of rack 44 as shown in Fig. 2. The shaft 51 may be rocked by means of the lever 53 for effecting reciprocation of the rack in a manner previously described. For the purpose of retaining the rack and container support frame in adjusted positions, a locking means is employed, which means may best be described with reference to Figs. 3 and 5.

The locking means comprises a pair of toothed clutch members 56 and 57, each of which is provided with teeth 58 adapted to mesh for forming an interlocking means. Clutch member 57 is provided with a bore 59 adapted to freely receive shaft 51 (Fig. 3). Member 57 may be fixedly secured to a boss 60 formed on the housing 11, or it may be adjustably secured thereon as shown in the drawings. To provide for adjustment thereof, the member 57 is provided with a plate like extension 61 having an elongated slot 62 for freely receiving a bolt or screw 63 which may enter a threaded bore 64 formed in the boss. Tightening the screw precludes movement of the clutch member relative to the boss.

Clutch member 56 is provided with an integral sleeve portion 65 slidable on shaft 51. A bored boss 66 on lever 54 is adapted to loosely receive said sleeve portion and is pinned or otherwise secured thereto as at 67 to preclude relative longitudinal movement of the sleeve portion and boss 66. The lower end 68 of the lever 54 is formed to provide a bifurcated extension 69 disposed at an angle to the lever. The forks of said extension are provided with elongated slots 70 as shown in Fig. 3.

Fixedly mounted on shaft 51 at the end 510 thereof is an arm 71 carrying at the free end thereof a pin 72 which passes through perforations 70 to provide a pivotal connection for lever 54. The arm member 71 may be keyed or otherwise secured to shaft 51 to preclude relative movement thereof. It should be clear from the foregoing, that as lever 54 is moved in a vertical plane, the shaft will be moved to actuate the rack 44 and the frame 24 connected thereto. To lock the device in adjusted positions, it is necessary only to move the lever toward the housing 11 whereby to slide clutch member 56 along the shaft to interlock with stationary clutch member 57.

The means employed to counterbalance the weight of the frame 24 and mixing bowl 21 comprises a pair of compression springs 73 having suitable connection with the shaft 51. As the springs and their connections are identical in construction and operation, a description of one will suffice for the other also.

Spring 73 is adapted to extend about a guide rod 74 which is supported adjacent each end thereof by brackets 75 and 76 carried by housing 11. The rod is precluded from movement by lock nuts 77 associated with the threaded end 78 of the guide rod. The spring is compressible between an adjustable stop comprising a nut and washer 79 and 80, and a flanged sleeve 81 slidable on rod 74. The flange 82 of sleeve member 81 carries an extending lug 83 to which may be secured one end 84 of a chain or the like 85. The other end of chain 85 is fastened to a collar or drum 86 movable with shaft 51. It should be apparent from the disclosure in Fig. 3 that as lever 54 is actuated to lower the mixing bowl, the chain 85 will be wound about the collar or drum 86. This will serve to move the flanged sleeve 81 upwardly along the guide rod and against the resistance of compression spring 73. As soon as the bowl is lowered, the lever may be locked in position with the springs compressed.

When it is desired to again raise the bowl, the lever is actuated to release the locking means, whereupon the energy of the compressed springs is utilized to assist in raising the bowl to mixing position.

As shown in Figs. 2 and 4, the flange 22 of the mixing bowl is provided with depending bumper or guide members 87. The purpose of said bumper or guide members is to abut the free ends 250 of the arms 25 when the bowl is rolled to lifting position. This insures perfect alignment of the guide lugs 26 with the cooperating perforations 27 of the flange as shown in Fig. 4.

It is to be understood that various changes and modifications may be made in the structural details of the device without departing from the spirit and scope of the invention as set forth in the appended claims.

What is claimed is:

1. In a device of the class described, the combination with a supporting structure, of a container support frame slidably mounted upon the supporting structure and adapted for reciprocation between upper and lower limits, relative to the supporting structure, means for locking a container to said frame, said means comprising an arm pivotally mounted on the frame, a latch portion on the arm, means for effecting engagement of the latch portion with a container supported by the frame when the frame is moved from the lower position, and a trip lug on the supporting structure for cooperating with the arm to effect release of the container when the frame is returned to the lower limit of travel.

2. In a device of the class described, the combination with a supporting structure, of a container support frame slidably mounted upon the supporting structure and adapted for reciprocation between upper and lower limits, relative to the supporting structure, means for locking a container to said frame, said means comprising an arm pivotally mounted upon the frame, a latch portion on the arm, means for effecting engagement of the latch portion with a container upon elevating the frame, and means for actuating the arm to release said container upon lowering of the frame.

3. In a device of the class described, the combination with a supporting structure, of a container support frame slidably mounted upon the supporting structure and adapted for reciprocation, between upper and lower limits, relative to the supporting structure, and locking means associated with the container support frame for locking a container to said frame upon upward movement thereof and adapted for releasing said container upon lowering the frame.

4. In a device of the class described, the combination with a supporting structure of a frame movable within upper and lower limits relative to the supporting structure, a pair of arms carried by the frame and movable therewith for supporting a container in adjusted positions, and locking means rendered operative when the frame is elevated for automatically securing a container to the frame.

5. In a device of the class described, the combination with a supporting structure provided with an agitator, of a frame movable within upper and lower limits relative to the supporting structure, means for moving the frame relative to the supporting structure, a pair of arms carried by the frame and movable therewith for supporting a container in adjusted positions relative to the agitator carried by the supporting structure, a locking means, operative when the frame is elevated, for securing a container to the frame, and means rendering said locking means inoperative when the frame is moved to the lower limit of travel.

6. In a device of the class described, the combination with a supporting structure, of a frame movable within upper and lower limits relative to the supporting structure, said frame being adapted for supporting a container, and engageable means for moving the frame and securing it in adjusted positions between the upper and lower limits of travel of the frame.

7. In a device of the class described, the combination with a supporting structure, of a frame movable within upper and lower limits relative to the supporting structure, a pair of arms carried by the frame and movable therewith for supporting a container at diametrically opposite points of the container, and means, operative when the frame is moved from the lower limit of travel, for precluding tipping of the container relative to the plane of the supporting arms.

8. In a device of the class described, the combination of a supporting structure, a pair of arms movable within upper and lower limits relative to the supporting structure, a container adapted for movement along a surface to a position between the arms when the arms are in the lowermost position, laterally extending means on the container adapted to be disposed above and in spaced relation to the arms when the container is in said position between the arms, and means for elevating the arms whereby to cause abutment of the arms with the laterally extending means on the container for elevating the container relative to the supporting structure.

9. In a device of the class described, the combination of a supporting structure, a pair of arms movable within upper and lower limits relative to the supporting structure, a container adapted for movement along a surface to a position between the arms when the arms are in lowermost position, laterally extending means on the container adapted to be disposed above and in spaced relation with the arms when the container is in said position between the arms, means for elevating the arms whereby to cause abutment of the arms upon the extending means of the container for elevating the container relative to the supporting structure, and means for securing the container and arms in various elevated positions.

10. In a device of the class described, the combination of a supporting structure, a frame movable within upper and lower limits relative to the supporting structure, arms extending from the frame, a container adapted for movement along a surface to a position between the arms when the arms are in the lowermost position, extending means on the container adapted to be disposed above and spaced from the arms when the container is in said position between the arms, means for elevating the frame whereby to cause abutment of the arms upon the extending means of the container for elevating the container, means for locking the frame in adjusted positions relative to the supporting structure, and means operative when the container is elevated, for locking the container to the frame.

11. In a device of the class described, the combination of a supporting structure, a frame movable within upper and lower limits relative to the supporting structure, a pair of extending arms carried by the frame, a flanged container adapted for movement along a surface to a position between the arms, with the flange of the container disposed above and in spaced relation with the arms when in the lowermost position, and cooperating means on the arms and flange whereby to effect locking of the arms upon the flange of the container when the frame is raised.

12. In a device of the class described, the combination with a supporting structure, of a frame movable within upper and lower limits relative to the supporting structure, a pair of arms carried by the frame and movable therewith for elevating and lowering a container supported by the arms, means effective when the frame is in elevated positions, for precluding rotary movement of the container relative to the supporting arms, and locking means normally engaging the container and automatically released upon movement of the frame to the lower limit of travel.

13. In combination a bowl, a tractional support carried thereby, a pair of elevating arms to receive the bowl between them, means on the bowl to effect a predetermined positioning of the bowl relative to the arms when the bowl is pushed between the arms upon the tractional bowl support and cooperative means on the bowl and said arms to effect engagement when the arms are raised to retain the bowl upon the arms against rotary and tipping movement.

14. In combination a bowl, a pair of elevating arms spaced to permit movement of the bowl between them when the arms are in a lowered position, and cooperating means on the bowl and arms to engage the bowl and arms and to lock the bowl thereon by elevating said arms, said cooperating means serving to release the bowl when said arms are moved to a lowered position.

15. In combination a bowl having an outwardly extending member provided with apertures at opposite sides of the bowl, an elevating means for the bowl comprising spaced arms between which the bowl may enter, means on the arms for entry into the apertures in the outwardly extending member, said means being below said outwardly extending member when the bowl rests on a supporting surface and the arms are in a lowered position.

16. In combination a mixing bowl having transverse perforate support means, an elevating arm structure upon which the bowl support may rest, a tractional support for moving the bowl over a surface to and from a position between the arms, pins in the arms for entry into the perforations of the support means, lugs on the bowl cooperating with the ends of the arms for effecting positioning of the support means relative to the pins when the bowl is pushed on its tractional support between the arms, raising of the arms serving to enter the pins in the perforations in the support means, and a latch on the arm structure operative on the bowl support upon raising of the arms and bowl.

17. In combination a mixing bowl, a support means on the bowl, an elevating arm structure upon which the bowl support means may rest, a tractional support means associated with the bowl for movement of the bowl over a surface to and from a position between the arms, abutments on the elevating arm structure, registrable means for retaining the bowl upon the arm structure in a predetermined position, and means associated with the bowl and cooperating with the abutments on the elevating arm structure for guiding the bowl and effecting alignment of the registrable means.

18. In combination a bowl adapted to be moved along a surface, a standard extending substantially perpendicularly relative to the said surface, a pair of elevating arms on the standard for receiving the bowl between them, said arms having extending abutments, and cooperative bumper members on the bowl for striking the extending abutments of the arms and serving to dispose the bowl in the same position, relative to the arms, upon each complete insertion of the bowl between the arms.

19. In combination a bowl adapted to be moved along a surface, a standard extending perpendicularly relative to the said surface, a pair of elevating arms on the standard for receiving the bowl between them, said arms having extending abutments, cooperative means on the bowl and arms for precluding relative rotational and lateral movement of the bowl upon the arms, and bumper members on the bowl for striking the extending abutments of the arms and serving, upon complete insertion of the bowl between the arms, to align the cooperative means.

In testimony whereof I have hereunto subscribed my name this 5th day of November, 1928.

SIGMUND SCHIFF.